US012527301B2

(12) United States Patent
Phillips et al.

(10) Patent No.: US 12,527,301 B2
(45) Date of Patent: Jan. 20, 2026

(54) MODULAR AND COLLAPSIBLE HOUSING SYSTEM FOR YOUNG POULTRY

(71) Applicants: Tyler Phillips, Germantown, MD (US); William Stefany, Gaithersburg, MD (US)

(72) Inventors: Tyler Phillips, Germantown, MD (US); William Stefany, Gaithersburg, MD (US)

(73) Assignee: RentAcoop, LLC, Germantown, MD (US)

( * ) Notice: Subject to any disclaimer, the term of this patent is extended or adjusted under 35 U.S.C. 154(b) by 149 days.

(21) Appl. No.: 18/605,113

(22) Filed: Mar. 14, 2024

(65) Prior Publication Data

US 2025/0287927 A1    Sep. 18, 2025

(51) Int. Cl.
*A01K 31/19*    (2006.01)
(52) U.S. Cl.
CPC .................................. *A01K 31/19* (2013.01)
(58) Field of Classification Search
CPC ........ A01K 31/19; A01K 31/22; A01K 31/07; A01K 31/08; A01K 1/0245; A01K 31/02; A01K 1/0125
See application file for complete search history.

(56) References Cited

U.S. PATENT DOCUMENTS

| 2,654,498 | A | * | 10/1953 | Jennison | B65D 85/50 217/14 |
| 2,950,484 | A | * | 8/1960 | Jaffe | A47K 3/064 5/98.1 |
| 3,376,994 | A | * | 4/1968 | Flinn, Jr. | B65D 9/14 217/14 |
| 3,601,172 | A | * | 8/1971 | Bourquin | B65D 85/07 217/14 |
| 3,611,994 | A | * | 10/1971 | Bailey | B65D 7/26 217/15 |
| 3,703,159 | A | * | 11/1972 | Rose-Miller | B65D 85/50 119/71 |
| 3,743,170 | A | * | 7/1973 | Riccio | A01K 1/0125 119/168 |
| 4,014,292 | A | * | 3/1977 | Coughlin | A01K 1/0125 229/101 |

(Continued)

*Primary Examiner* — Monica L Perry

(57) ABSTRACT

The present invention relates to a collapsible brooder structure designed to enhance the efficiency and convenience of poultry housing. The brooder features a unique folding mechanism that allows for easy assembly and disassembly, facilitating compact storage and transport. Central to the invention are a top lid with ventilation openings and secure locking mechanisms, foldable left and right-side portions that divide into halves for collapse, and a segmented bottom portion with folding lines for inward folding. The structure also includes a front portion with a two-door mechanism, providing access while ensuring security with a locking system. A removable tray with vertical edges fits snugly at the bottom, supporting poultry and facilitating maintenance. This innovative design addresses space, transport, and usability challenges in poultry farming, offering a versatile, scalable solution for efficient poultry rearing across various farming scales, thereby improving operational efficiency and animal welfare.

14 Claims, 8 Drawing Sheets

(56) References Cited

U.S. PATENT DOCUMENTS

| | | | | |
|---|---|---|---|---|
| 4,576,329 A * | 3/1986 | Wright | ............... | B65D 5/46024 |
| | | | | 229/117.03 |
| 4,890,576 A * | 1/1990 | James | .................. | B65D 5/0005 |
| | | | | 119/168 |
| 4,903,637 A * | 2/1990 | Devault | ................. | A01K 1/033 |
| | | | | 119/497 |
| 4,986,217 A * | 1/1991 | Robinson | ............. | A01K 1/0125 |
| | | | | 229/117.02 |
| 5,027,748 A * | 7/1991 | Wolak | .................. | A01K 1/0125 |
| | | | | 383/66 |
| 5,839,392 A * | 11/1998 | Pemberton | ........... | A01K 1/0245 |
| | | | | 119/498 |
| 5,865,140 A * | 2/1999 | McGivern | ............ | A01K 1/0125 |
| | | | | 119/168 |
| 7,699,212 B2 * | 4/2010 | Turvey | ............... | B65D 21/0219 |
| | | | | 206/508 |
| 9,527,626 B1 * | 12/2016 | Coronado | ............ | B65D 11/186 |
| 2015/0125096 A1 * | 5/2015 | Mulholland | ........... | B65D 31/02 |
| | | | | 383/38 |

* cited by examiner

MODULAR AND COLLAPSIBLE HOUSING SYSTEM FOR YOUNG POULTRY

TECHNICAL FIELD

The present invention pertains to the field of agricultural and poultry farming equipment, specifically focusing on housing solutions for young poultry, such as chicks. It encompasses the design, manufacturing, and use of portable, collapsible structures intended to provide a controlled and protective environment for the rearing of baby chicks. The technical aspects of the invention involve innovations in structural design and assembly mechanisms to achieve a balance between portability, ease of use, environmental control, and durability.

BACKGROUND

In the agriculture and poultry industries, the early stages of poultry rearing play a critical role in the development and health of livestock, particularly for baby chicks. The environment in which these young birds are raised can significantly influence their survival rates, growth, and overall well-being. Traditionally, brooders are utilized to provide a controlled and protective space for these chicks. However, existing solutions often face limitations regarding efficiency, portability, and adaptability to various scales of poultry farming operations.

Chick brooders are essential for several reasons. Firstly, they provide a controlled environment that can be adjusted to maintain the optimal temperature, humidity, and ventilation necessary for the young birds' survival and growth. Secondly, they protect the chicks from predators, pests, and diseases that could significantly impact their survival rates. The design of these structures plays a vital role in ensuring easy access for feeding, cleaning, and monitoring the chicks' health.

Current brooder solutions for housing chicks often suffer from several drawbacks. Traditional brooders are typically constructed as permanent or semi-permanent structures, which makes them inflexible to changes in location, size, or capacity. This rigidity can be a significant disadvantage for users who need to adjust their operations based on seasonal changes, flock size, or other operational considerations.

Furthermore, conventional chick brooders can be cumbersome and time-consuming to assemble or disassemble, requiring significant labor and potentially specialized tools or expertise. This limitation not only affects the efficiency of poultry farming operations but also contributes to increased costs and logistical challenges. Moreover, the fixed nature of these structures often leads to challenges in transportation and storage when not in use. For small-scale farmers or those with limited space, these factors can deter the adoption of optimal chick-rearing practices, thus affecting productivity and sustainability.

Thus, there is a clear need for a more adaptable, efficient, and user-friendly solution for chick housing. A foldable and easy-to-install brooder would address many of the current shortcomings by providing poultry farmers with a versatile and portable option. Such a solution would enable quick setup and teardown, making it ideal for various operational scales, from small backyard operations to larger commercial farms. A foldable design would significantly reduce the storage space required when the brooders are not in use, thus offering a practical solution for space-constrained environments. Additionally, the ease of installation and disassembly without the need for specialized tools or extensive labor would make poultry farming more accessible and reduce the barriers to entry for new users.

SUMMARY

The present invention discloses an innovative folding mechanism, which is designed as a housing solution for baby chicks, hereinafter may be referred to as a "brooder". The brooder is designed for space-saving during shipping while providing maximum space when assembled. The folding mechanism allows the brooder to be compact for storage or shipping and easily expandable for use in indoor as well as outdoor environment. The product (i.e., the brooder) consists of several connected pieces that facilitate easy folding and unfolding. It includes heat-connected sections for stability and durability. The design involves a slit in the middle and connections at the sides that allow the structure to fold and unfold efficiently. Although the product has been designed as a chick brooder, its applicability may be extended to various types of boxes or containers. The brooder may also include an inner component added for stability after assembly. The brooder can have a smaller or larger version, indicating that the unique folding mechanism can be scaled to accommodate different sizes, enhancing the product's versatility.

The collapsible brooder structure for housing poultry includes a top lid with cylindrical openings and locking mechanisms for securing to vertical side portions. The brooder further includes a front portion featuring a door with a two-door mechanism, a locker, and handles, and attached horizontal securing components. The brooder further includes left and right-side portions designed to fold inward from their centers, equally dividing into two halves. The brooder further includes a bottom portion segmented into multiple parts with designated folding lines facilitating inward folding for collapse. The brooder further includes edge connectors located at each top edge for securing the top lid to corresponding vertical side portions. The brooder further includes a removable tray designed to fit within the interior of the brooder at the bottom, featuring a horizontal portion and vertical edges all around.

These and other features and advantages of the present invention will become apparent from the detailed description below, considering the accompanying drawings.

BRIEF DESCRIPTION OF THE DRAWINGS

Figure 1:
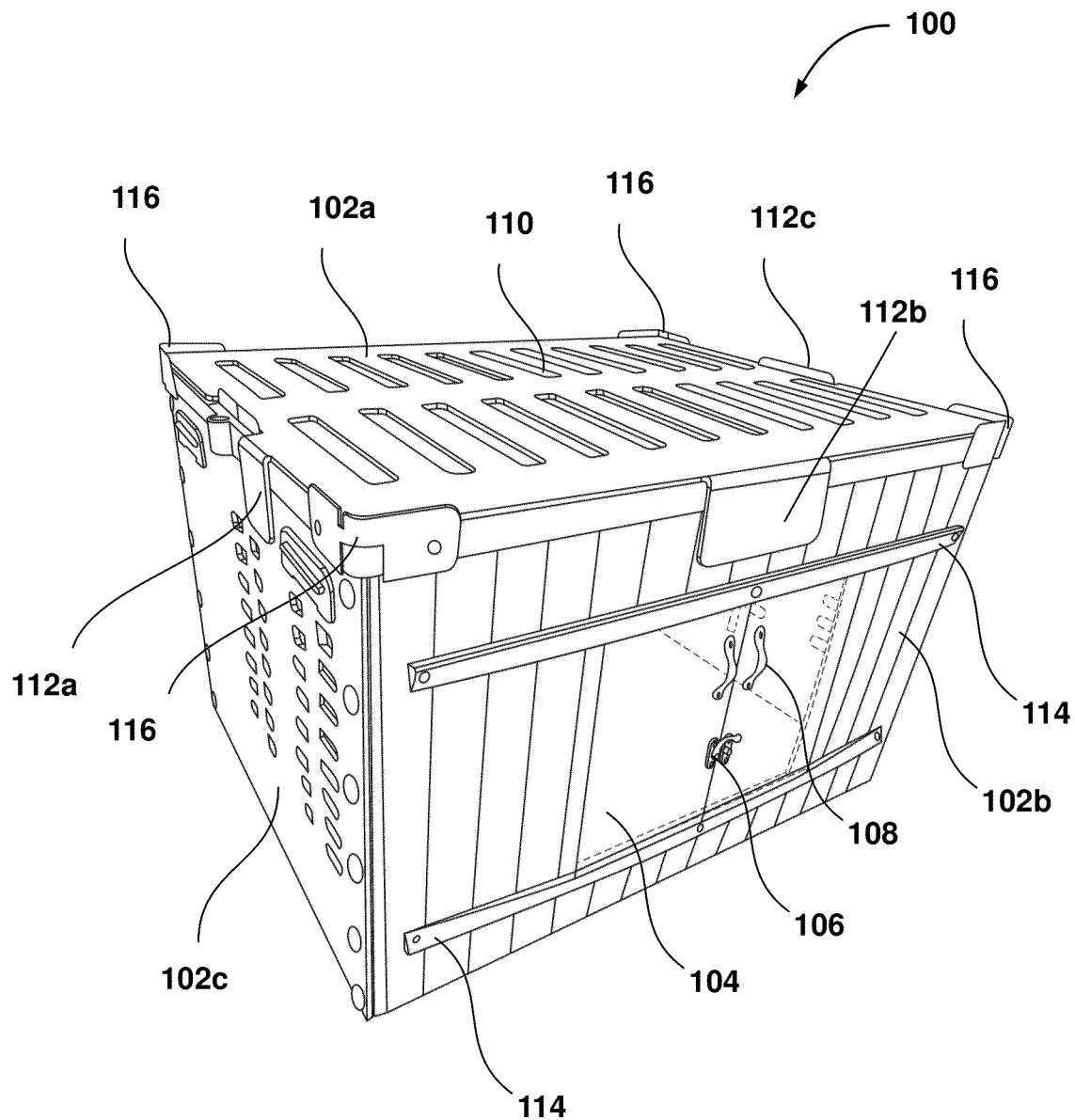

Having thus described the invention in general terms, reference will now be made to the accompanying drawings, which are not necessarily drawn to scale, and wherein:

FIG. 1 is a diagram that illustrates an assembled brooder in use condition or non-collapsed position, in accordance with various embodiments of the present disclosure.

Figure 2:
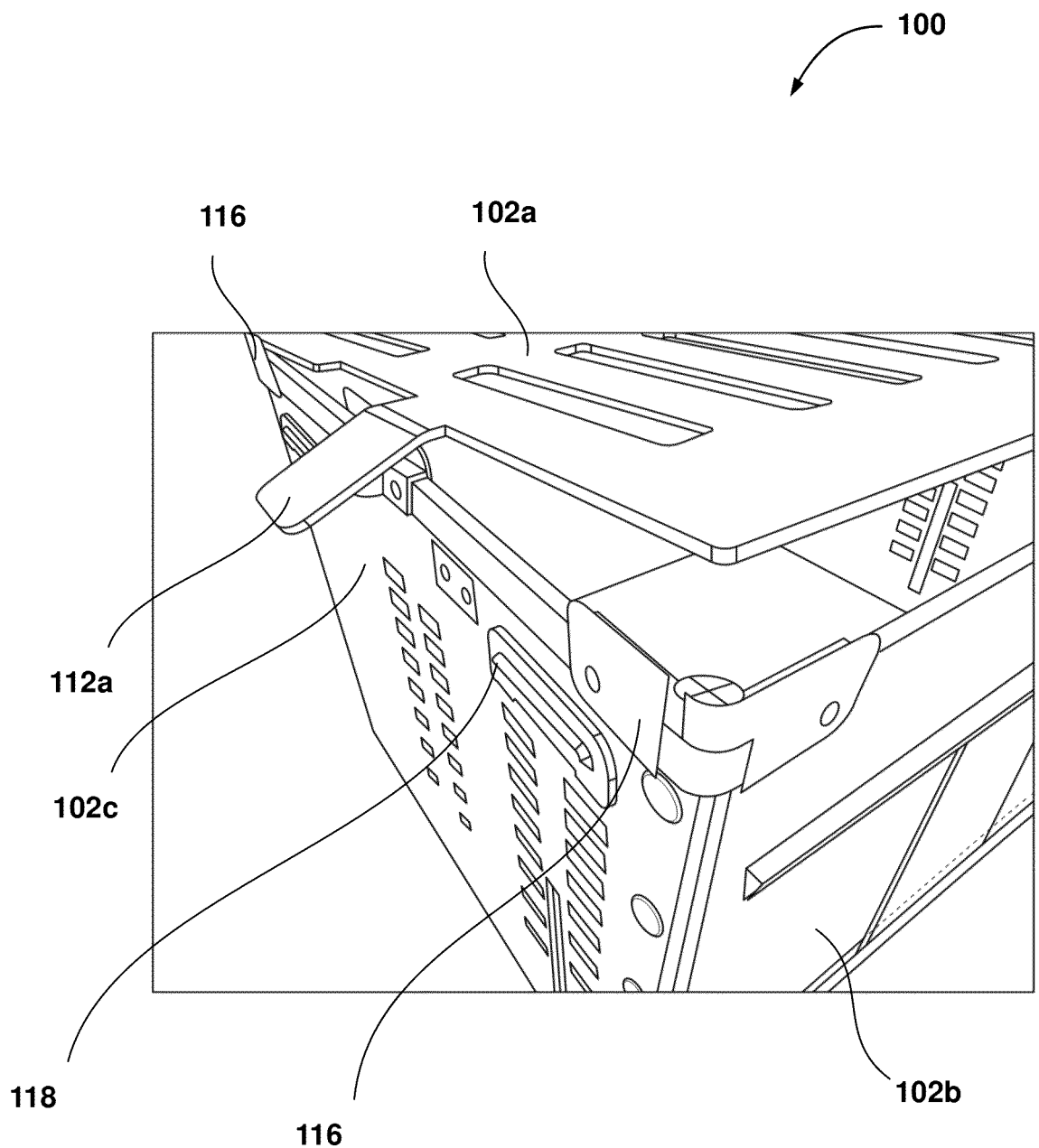

FIG. 2 is a diagram that illustrates a portion of the brooder with an upper lid, a side portion, and a front portion, in accordance with various embodiments of the present disclosure.

Figure 3:
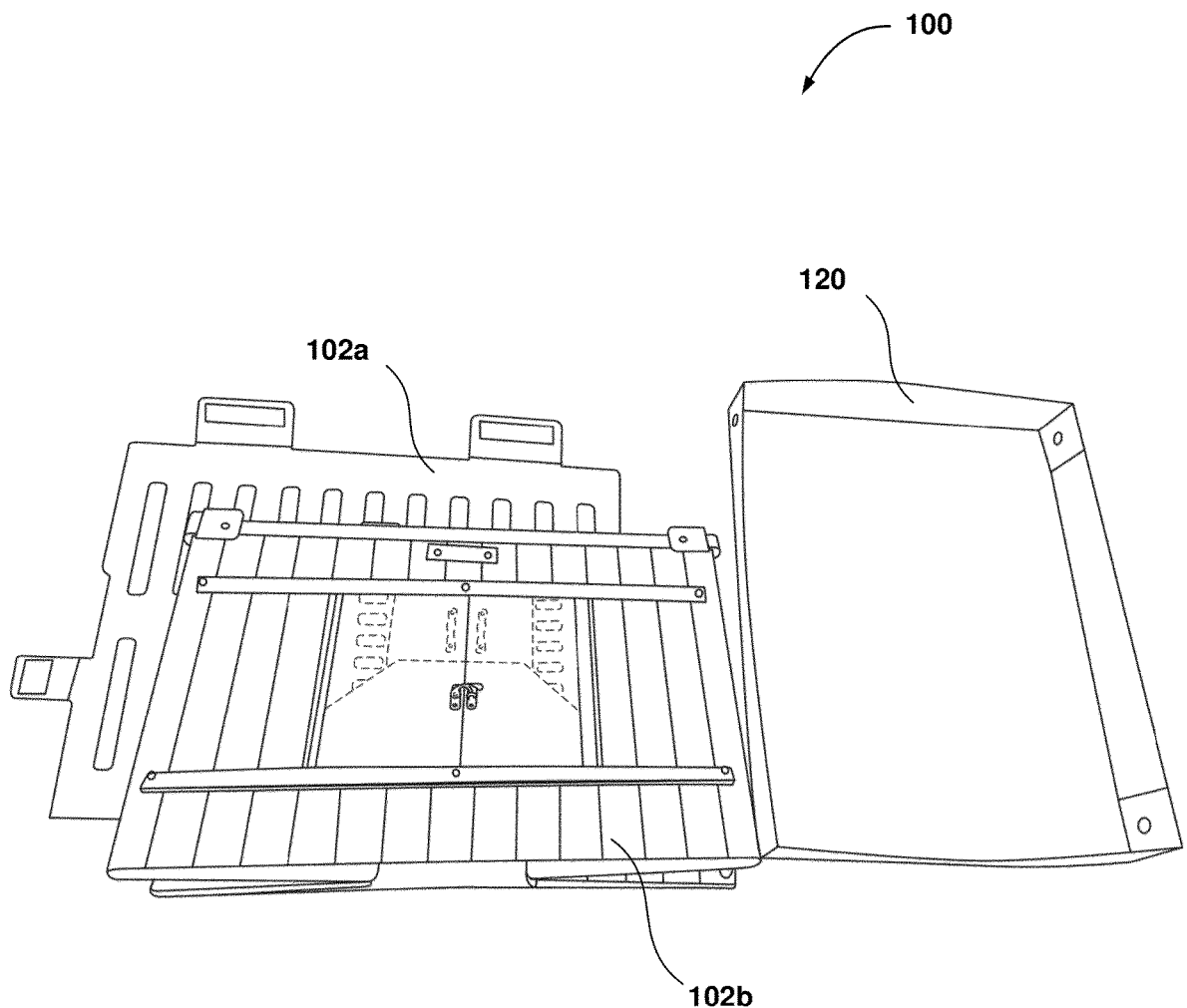

FIG. 3 is a diagram that illustrates the brooder in a collapsed state, in accordance with various embodiments of the present disclosure.

Figure 4:
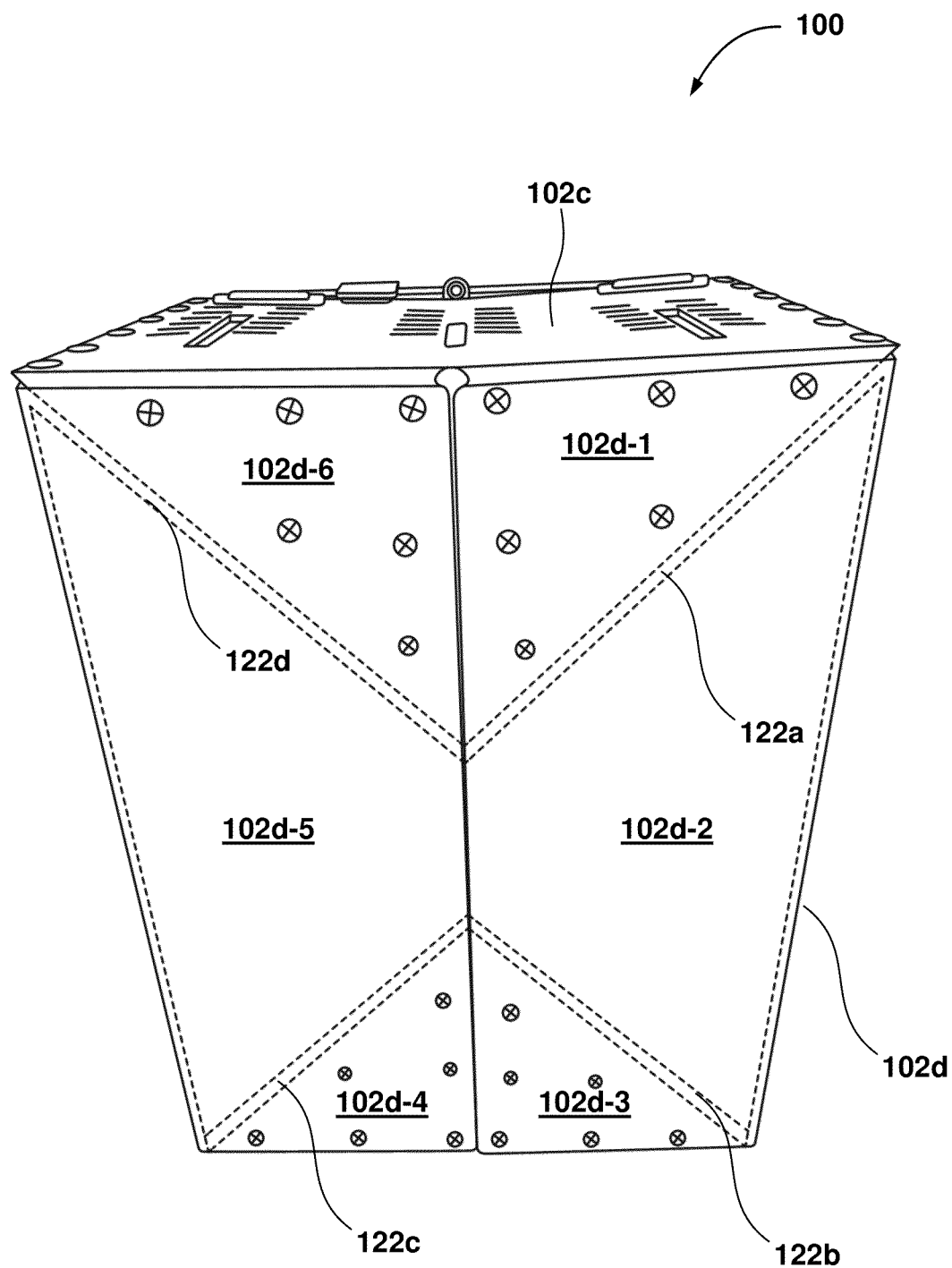

FIG. 4 is a diagram that illustrates a bottom view of the brooder, in accordance with various embodiments of the present disclosure.

Figure 5:
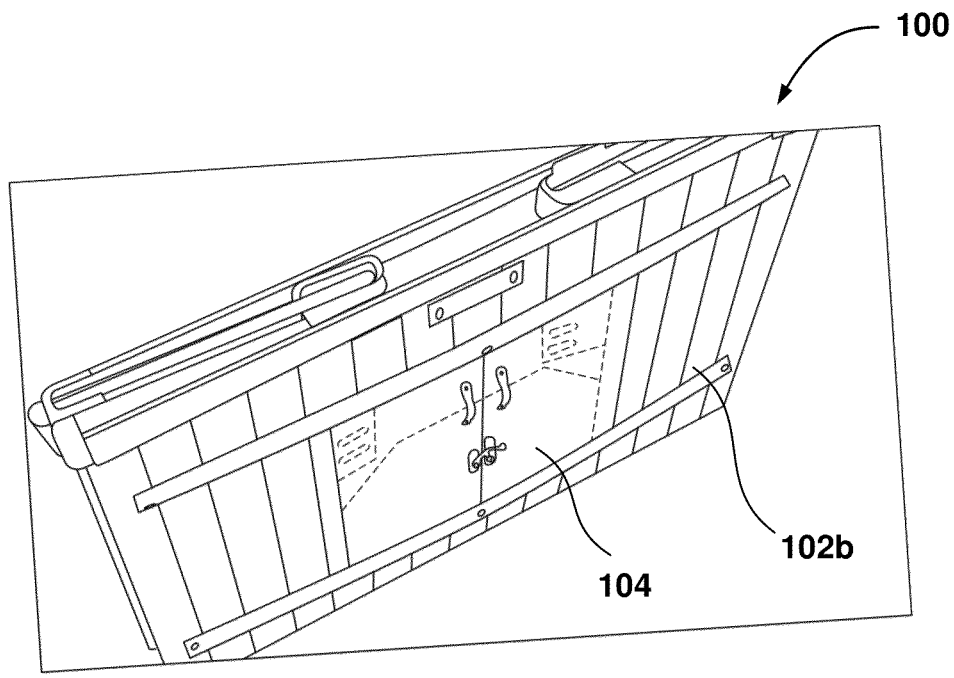
Figure 6:
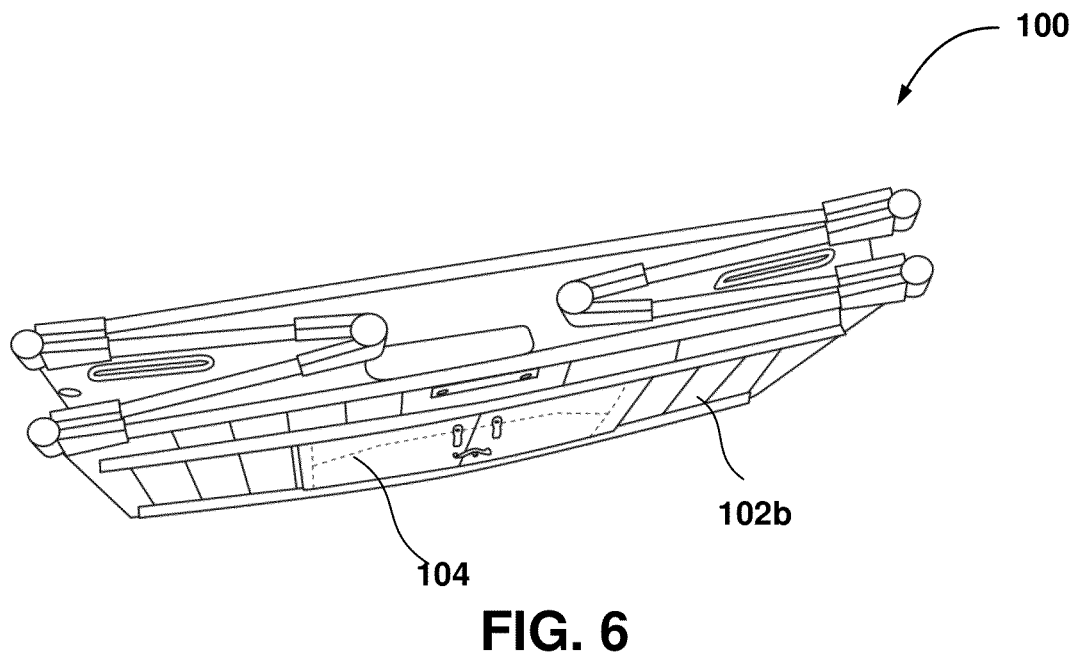
Figure 7:
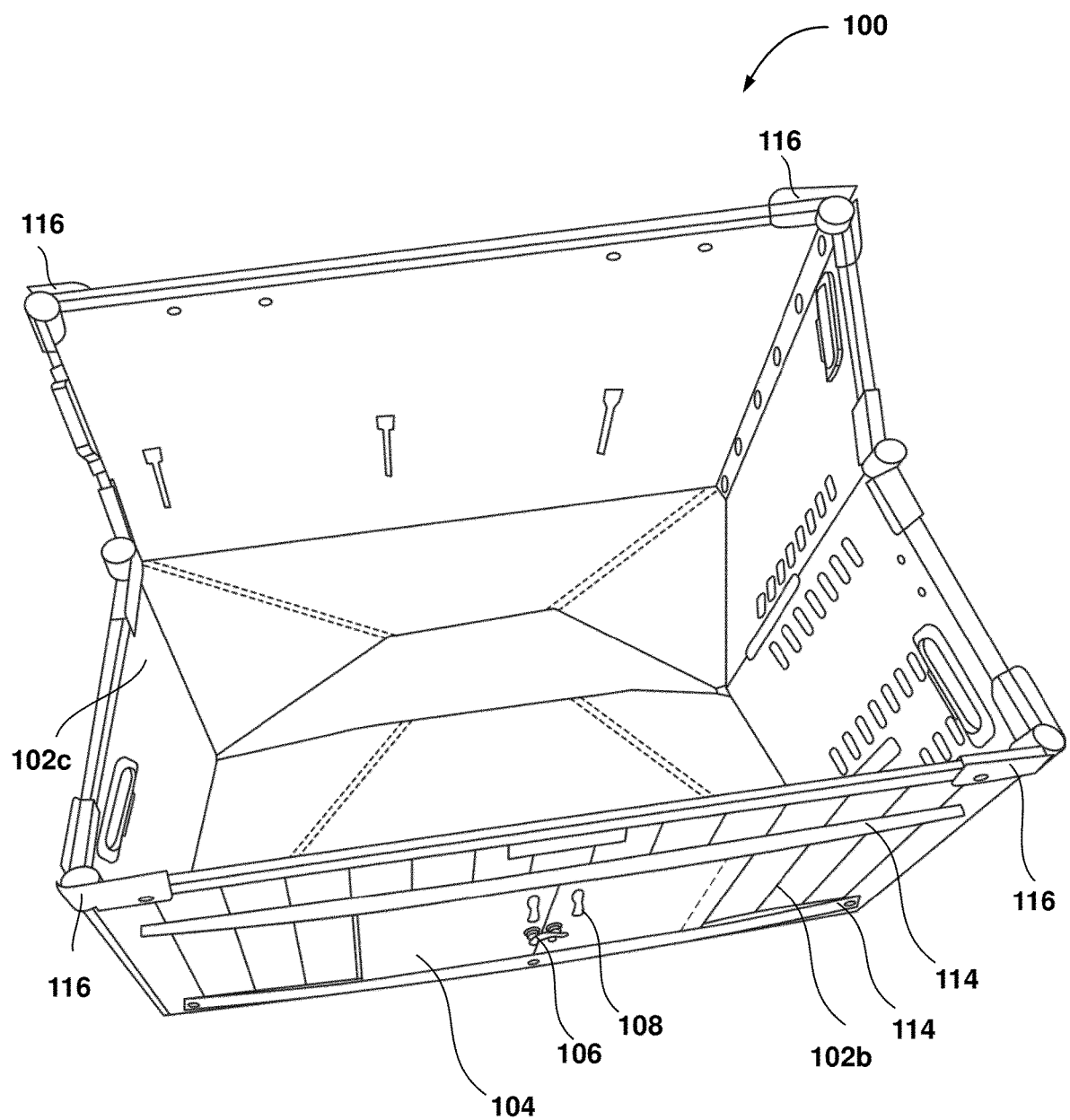

FIGS. 5, 6, and 7 are diagrams that illustrate foldability aspects of the brooder, in accordance with various embodiments of the present disclosure.

Figure 8:
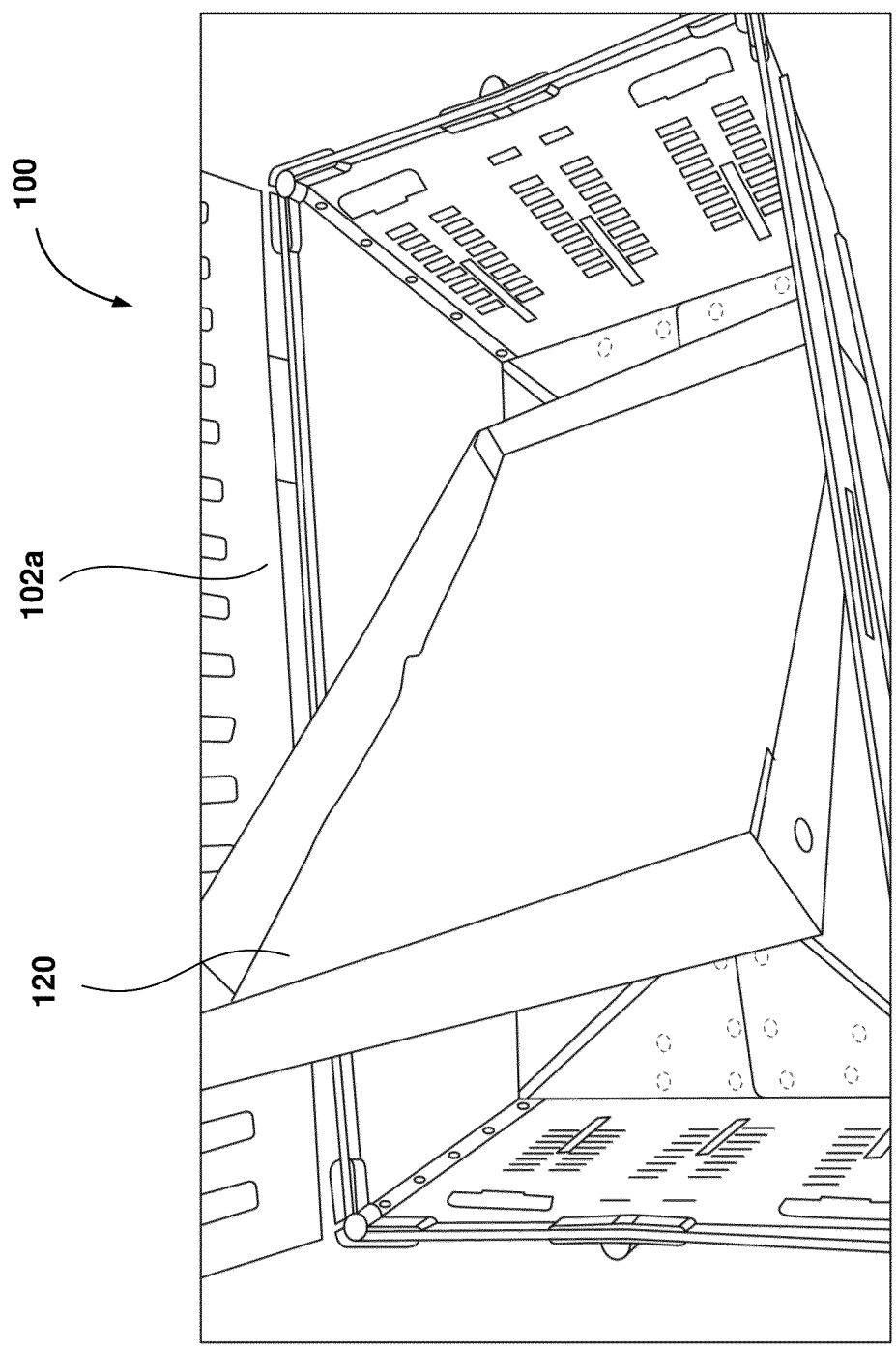

FIG. 8 is a diagram that illustrates a removable tray and its placement in the brooder, in accordance with various embodiments of the present disclosure.

Figure 9:
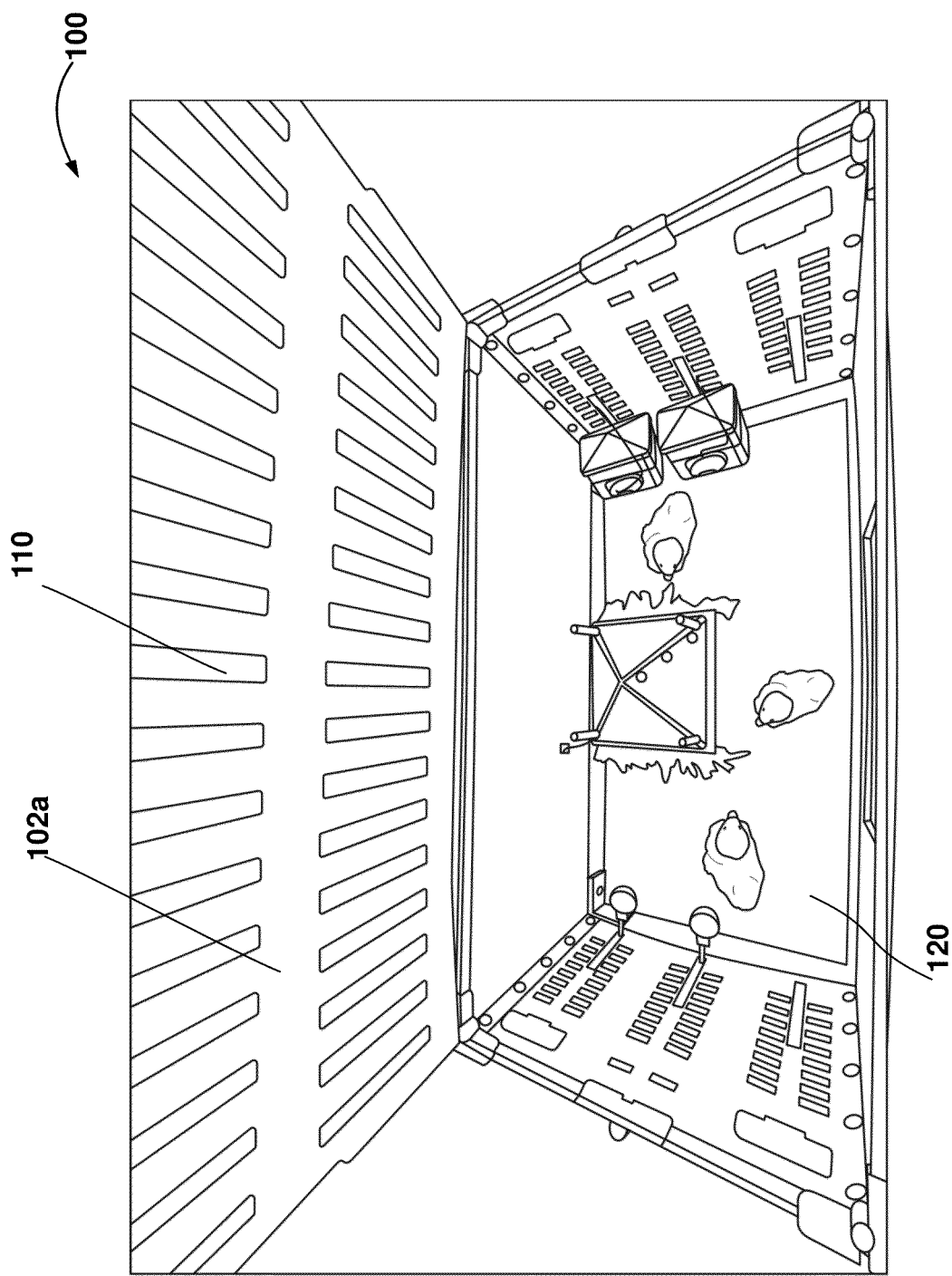

FIG. 9 is a diagram that illustrates a use case scenario in which baby chicks are placed inside the brooder, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth to provide a thorough understanding of the present technology. It will be apparent, however, to one skilled in the art that the present invention can be practiced without these specific details. In other instances, structures and components are shown in block diagram form only to avoid obscuring the present disclosure.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. Among various embodiments, the innovative brooder with folding mechanism has been disclosed and described here after. The brooder has been designed for space-saving usage while providing maximum space when assembled. The embodiments' described figures are intended and provided to illustrate embodiments of the disclosure described below and are not necessarily drawn to scale. In the drawings, like numbers refer to like elements throughout, and the thicknesses and dimensions of some components may be exaggerated for providing better clarity and ease of understanding. Further, the terms "a" and "an" herein do not denote a limitation of quantity, but rather denote the presence of at least one of the referenced items.

The disclosed brooder incorporates a unique folding design allowing it to transition from a compact size for shipping to a fully expanded size for use. This design is centered around efficient space utilization and ease of assembly and disassembly. The brooder is made up of connected pieces that facilitate the folding and unfolding process. Specific connections are made through heat application, ensuring the pieces remain attached but can fold as needed. Further, a slit in the middle of certain parts, along with strategic fold lines, allows for the seamless transformation of the brooder's shape. This design is critical for the case of opening and closing the unit. When folded, the brooder becomes significantly smaller, making it easy to transport and store. This portability is a key feature intended for the product. An inner piece, for example, a tray, is included for additional stability after the brooder is assembled. This component ensures that the structure remains secure and functional when in use. The design is scalable, allowing for variations in size (such as "Little Red Brooder" and "Big Red Brooder" versions). This adaptability makes it suitable for different scales of poultry farming operations.

Applications: The disclosed brooder has been primarily designed as a housing solution for baby chicks, providing them with a safe and controlled environment during their early stages of development. Beyond poultry farming, the folding mechanism could be adapted for various types of containers or boxes, serving multiple industries requiring efficient storage and transport solutions.

Advantages: The foldable design allows for minimal space usage during transport and storage, reducing costs and environmental impact. The brooder can be quickly set up and taken down without the need for specialized tools or extensive labor, making it user-friendly and accessible. The ability to adjust the size of the brooder according to need makes it suitable for various scales of operations, from small backyard farmers to larger commercial poultry operations. Its compact, folded state enhances portability, making it ideal for farmers who need to move or adjust their setups frequently. The reusability and space-saving features contribute to a more sustainable approach to poultry farming, aligning with environmental conservation efforts.

The present invention aims to address and solve the existing limitations in chick housing through innovative design and functionality, potentially revolutionizing the way poultry farmers approach the early stages of chick rearing. Now the present invention will be described in detail with reference to illustrated drawings FIGS. 1 to 9.

FIG. 1 is a diagram that illustrates an assembled brooder 100 in use condition or non-collapsed position, in accordance with various embodiments of the present disclosure. The brooder 100, when assembled, includes various portions and components that contribute to its functionality and structural integrity. The top lid 102a serves as the primary cover for the brooder 100, providing protection and ventilation. The ventilation is ensured by providing openings 110, which could be for air circulation or light penetration. These openings, shown as cylindrical, allows for adequate airflow while preventing larger debris or predators from accessing the interior.

The front portion 102b includes a door 104 with a dual-door mechanism, enhancing access control and possibly the management of the interior environment. This door 104 is equipped with a locker 106 and handles 108, which together improve security and ease of use. The locker 106 ensures the door remains closed when necessary, protecting the inhabitants from external elements or predators. The handles 108 facilitate easy opening and closing, important for daily tasks like feeding or cleaning.

The locking mechanisms 112a, 112b, 112c are integrated into the top lid 102a, securing it to the vertical side portions 102b, 102c, etc. of the brooder 100. These mechanisms could vary in type, including Velcro or button locks, offering flexibility in how securely the brooder 100 can be sealed. This versatility ensures that the brooder 100 can be easily accessed by a caretaker while remaining secure against unintended entry.

The front portion 102b may be further reinforced with horizontal securing components 114, specifically designed to hold the door 104 firmly within the front frame. This highlights an emphasis on durability and security, ensuring that the door remains functional and secure over time. The edge connectors 116, placed at each top edge of the brooder 100, helps in maintaining the structural integrity of the assembled brooder 100. These connectors 116 may ensure that the top lid 102a and side portions remain tightly joined, preventing gaps or misalignments that could compromise the brooder's effectiveness or the safety of its inhabitants.

FIG. 2 is a diagram that illustrates a portion of the brooder 100 with the upper lid 102a, a side portion 102c, and a front portion 102b, in accordance with various embodiments of the present disclosure. This illustration emphasizes the implementation of the edge connectors 116, strategically positioned to facilitate a secure junction between the upper lid 102a and the adjacent vertical sections, namely the front 102b and the left side 102c portions. Such edge connectors 116 may be instrumental in reinforcing the cohesion between the top lid 102a and the vertical panels 102b, 102c, etc., ensuring a stable and unified assembly.

The diagram further highlights the presence of the side lock mechanism 112a, depicted in an unlocked state, designed to fasten the upper lid 102a to the left side vertical section 102c securely. This locking feature exemplifies the brooder's versatile securing capabilities, allowing for the application of similar locking mechanisms across various junctions to enhance structural integrity.

The brooder 100 is further included with a grabber 118, a designed feature to enhance the brooder's portability. This grabber 118 allows for easy manual transportation of the brooder 100, facilitating relocation or adjustment within its operational environment. Further, multiple grabbers 118 may be integrated along each vertical segment to enhance user convenience and functionality.

Further, as shown, the side portions 102c of the brooder 100 are outfitted with multiple small openings, serving a dual purpose of ensuring adequate lighting and ventilation within the brooder's confines. This consideration not only addresses the well-being of the brooder's inhabitants by promoting air circulation and natural light penetration but also contributes to the overall structural design by integrating functional elements without compromising the brooder's integrity or security.

FIG. 3 is a diagram that illustrates the brooder 100 in a collapsed state, in accordance with various embodiments of the present disclosure. The comprehensive illustration of the brooder 100 when configured into its collapsed state is shown, meticulously detailing the disassembled components of the structure for efficient storage or transport. In this state, the brooder 100 is deconstructed into distinct segments or items, each represented separately to emphasize their individuality in the collapsed configuration. There is shown the top lid 102a, showcasing its ability to be detached or folded in alignment with the brooder's collapsible design principles. Similarly, the front vertical portion 102b is exhibited, further illustrating the brooder's modular nature, whereby significant structural elements can be disengaged or folded for compactness.

Additionally, the diagram introduces a tray 120, indicating its role within the brooder's overall structure and functionality. The inclusion of the tray 120 may be used in the brooder's operational state, potentially serving purposes such as feed distribution, waste collection, or as a base for the containment area.

The portrayal of brooder 100 in its collapsed state, through FIG. 3, emphasizes the invention's innovative approach to modularity, storage, and transportation. By delineating the separability and collapsibility of its core components, this diagram highlights the brooder's design flexibility, enabling a user-friendly disassembly process that facilitates minimal storage space requirements and ease of transport.

FIG. 4 is a diagram that illustrates a bottom view of the brooder 100, in accordance with various embodiments of the present disclosure. The diagram presents a detailed bottom perspective of the brooder 100 by showing the bottom portion 102d, elucidating the intricate configuration of its foundational structure. The bottom portion 102d may be segmented into two principal vertical components. Each component is further subdivided into three distinct segments, labeled as portions 102d-1, 102d-2, and 102d-3 for the first vertical section on the right-hand side, and portions 102d-4, 102d-5, and 102d-6 for the second vertical section on the left-hand side, as shown. Integral to this design are designated folding lines, marked as 122a, 122b, 122c, and 122d. These lines are strategically placed to facilitate the folding mechanism inherent to the brooder's design, enabling a compact and efficient collapse of the bottom structure 102d. Specifically, the folding line 122a delineates the fold between portions 102d-1 and 102d-2, while the folding line 122b serves as the axis for the fold between portions 102d-2 and 102d-3. Similarly, the folding line 122c guides the fold between portions 102d-4 and 102d-5, and the folding line 122d outlines the fold between portions 102d-5 and 102d-6. This arrangement ensures that during the collapsing process, the bottom portions 102d (102d-1, 102d-2, and 102d-3 and 102d-4, 102d-5, and 102d-6) may be folded inward in a sequential and orderly manner, aligning with the folding lines to minimize the overall footprint of the brooder 100 in its collapsed state. This feature is paramount to enhancing the brooder's storage and transportation efficiency, allowing for a seamless transition from an operational to a non-operational form factor.

FIGS. 5, 6, and 7 are diagrams that illustrate foldability aspects of the brooder 100, in accordance with various embodiments of the present disclosure. The innovative design of brooder 100 incorporates a sophisticated folding mechanism that significantly enhances its usability, storage, and transportation capabilities. This mechanism is particularly evident in the folding dynamics of the left and right-side portions as well as the bottom portions of the brooder 100. In an embodiment, each side portion of the brooder 100 is designed to fold inward from its center, effectively dividing it into two equal halves. This ingenious approach allows each side to collapse towards the interior of the structure, significantly reducing the brooder's overall width when not in use. The symmetry of this folding action ensures that the integrity and balance of the structure are maintained, even in its collapsed state, facilitating a seamless transition between extended and collapsed configurations. In an embodiment, the bottom portion of the brooder 100 features several segments delineated by folding lines, such as 122a, 122b, 122c, and 122d (FIG. 4). These lines act as pre-defined paths along which the bottom portions fold, guiding each segment to fold inward and underneath the structure. This methodical folding process allows the bottom portions to nest within each other, further compacting the brooder's form factor. Each segment's precise alignment and the strategic placement of folding lines ensure that the bottom structure collapses in a manner that complements the inward folding of the side portions, achieving a uniform and compact collapsed state.

The described folding mechanism offers several advantages that make the brooder 100 a superior solution for poultry housing needs. In its collapsed state, the brooder 100 occupies minimal space, making it ideal for storage or transportation. This space efficiency is especially beneficial for farmers who require flexibility in their operations or for those with limited storage space. The ability to reduce the brooder 100 to a compact form factor facilitates easier transportation, allowing for the relocation of the brooder 100 as needed without the requirement for large transportation vehicles or excessive logistical planning. The intuitive folding mechanism ensures that brooder 100 can be quickly and easily assembled or disassembled. This efficiency reduces the time and labor required to set up or take down the brooder 100, making it a convenient option for temporary or seasonal use. The folding design allows for the brooder 100 to be easily adjusted to varying sizes, making it adaptable to different numbers of occupants or available space. This flexibility ensures that the brooder 100 can meet a wide range of needs without the need for multiple distinct structures. Despite its folding nature, the design ensures that brooder 100 maintains structural integrity and durability when assembled. The precise engineering of folding lines and connections between portions ensures that the brooder 100 can withstand the rigors of use without compromise.

FIG. 8 is a diagram that illustrates a removable tray 120 and its placement in the brooder 100, in accordance with various embodiments of the present disclosure. The removable tray 120, as detailed in the diagram, has been designed to enhance its functionality and user experience. The tray 120 has been engineered to snugly fit within the brooder's interior, specifically positioned at the bottom to serve multiple purposes. The construction of the tray 120 includes a horizontal portion complemented by vertical edges encircling its perimeter. This design is strategic, not only facilitating a secure fit within the brooder 100 but also ensuring that the tray 120 effectively contains materials, debris, or waste, thus maintaining the cleanliness and hygiene within the brooder environment. The removable nature of the tray 120 allows for straightforward cleaning and maintenance. Users can easily extract the tray 120 from the brooder 100, dispose of the contents, clean it, and replace it, thereby ensuring a clean environment for the brooder's occupants with minimal effort. The tray 120 aids in maintaining a hygienic environment within the brooder 100. By isolating waste and making it easy to remove and clean, the tray 120 significantly reduces the risk of disease and pests, contributing to the health and well-being of the brooder's occupants. Further, the design of the tray 120, with its horizontal portion and vertical edges, ensures a snug fit within the brooder's interior. This precision in design simplifies the installation process, as the tray 120 can be easily slotted into place without the need for additional tools or complicated adjustments.

FIG. 9 is a diagram that illustrates a use case scenario in which baby chicks are placed inside the brooder 100, in accordance with various embodiments of the present disclosure. In the diagram illustrating a use case scenario for the brooder 100, the focus is on the practical application of housing baby chicks within a controlled environment facilitated by the inclusion of the tray 120. This tray 120, designed to nestle perfectly within the brooder's interior at the bottom, serves as a foundational platform for the chicks. The tray 120 is envisioned to feature a horizontal base complemented by vertical edges encircling its perimeter, ensuring containment and stability for the contents placed upon it. In this scenario, the baby chicks are comfortably situated on the tray 120, which acts as a place of their habitat within the brooder 100. This setup highlights the brooder's versatility and functionality, showcasing how the brooder 100, equipped with the removable tray 120, addresses practical aspects of poultry rearing. The tray's placement and design allow for easy access to the chicks for monitoring, feeding, and cleaning purposes, without disrupting the overall integrity of the brooder's structure.

The foregoing descriptions of specific embodiments of the present technology have been presented for purposes of illustration and description. They are not intended to be exhaustive or to limit the present technology to the precise forms disclosed, and obviously many modifications and variations are possible considering the above teaching. The embodiments were chosen and described to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

The invention claimed is:

1. A collapsible brooder structure for housing poultry, comprising:
    a bottom portion, vertical side portions, and a front portion assembled to form an enclosed interior;
    the vertical side portions comprising left and right-side portions each configured to fold inward along a central axis, dividing each into two equal halves;
    the bottom portion being segmented into multiple parts having designated folding lines each facilitating inward folding for collapse; and
    a top lid having openings and comprising locking mechanisms configured for securing to the vertical side portions.

2. The collapsible brooder structure of claim 1, wherein the locking mechanisms on the top lid include at least one of: hook and loop type locks and button type locks.

3. The collapsible brooder structure of claim 1, wherein the front portion further comprises a door, said door comprising a two-door mechanism, a locker, handles, and horizontal securing components configured to secure the door to the front portion.

4. The collapsible brooder structure of claim 1, further comprising edge connectors located at each top edge of said brooder structure.

5. The collapsible brooder structure of claim 4, wherein the edge connectors are configured for securing the top lid to corresponding vertical side portions.

6. The collapsible brooder structure of claim 1, wherein the left and right-side portions each comprise a folding mechanism that allows each said portion to fold along its central axis.

7. The collapsible brooder structure of claim 6, wherein the folding mechanisms of the left and right-side portions comprise pre-defined folding lines which facilitate the brooder's transition to a collapsed state for storage and transportation.

8. The collapsible brooder structure of claim 1, wherein the bottom portion folding lines enable the bottom portion to fold into a compact form.

9. The collapsible brooder structure of claim 8, wherein the bottom portion folding lines are configured to allow sequential folding of the bottom portion segments.

10. The collapsible brooder structure of claim 1, further comprising a removable tray configured to fit within the interior of the brooder at the brooder bottom portion, said removable tray comprising a horizontal portion having vertical edges all around.

11. The collapsible brooder structure of claim 10, wherein the removable tray is configured to support the weight of poultry and maintain structural integrity within the brooder.

12. The collapsible brooder structure of claim 11, wherein the vertical edges of the tray are configured to prevent displacement of materials placed on the tray.

13. The collapsible brooder structure of claim 1, wherein said brooder structure when collapsed is configured to maximize space efficiency during shipping and storage.

14. The collapsible brooder structure of claim 1, wherein the openings in the top lid comprise cylindrical openings configured to provide ventilation and light access to the interior of the brooder in the assembled state.

\* \* \* \* \*